United States Patent [19]
Campana et al.

[11] Patent Number: 5,000,426
[45] Date of Patent: Mar. 19, 1991

[54] EXOTHERMIC CUTTING TORCH

[75] Inventors: Patsie C. Campana; Patsie C. Campana, Jr., both of Lorain, Ohio

[73] Assignee: Edna Corporation, Loran, Ohio

[21] Appl. No.: 394,376

[22] Filed: Aug. 15, 1989

[51] Int. Cl.$^5$ .............................................. B23K 7/00
[52] U.S. Cl. .................................................... 266/48
[58] Field of Search ................... 266/48; 138/113, 114, 138/177

[56] References Cited

U.S. PATENT DOCUMENTS

| | | | |
|---|---|---|---|
| 1,930,285 | 10/1933 | Robinson | 138/114 |
| 3,110,754 | 11/1963 | Witort et al. | 138/114 |
| 3,738,288 | 6/1973 | Brandeberger | 266/48 |
| 3,921,542 | 11/1975 | Brandenberger | 110/1 R |
| 4,069,407 | 1/1978 | Brower | 266/48 |
| 4,114,863 | 9/1978 | Campana | 266/48 |
| 4,416,444 | 11/1983 | Brower | 266/48 |
| 4,437,649 | 4/1983 | Rieppel et al. | 266/48 |
| 4,541,616 | 9/1985 | Dean | 266/48 |
| 4,697,791 | 10/1987 | Henderson et al. | 266/48 |
| 4,787,142 | 11/1988 | Henderson et al. | 266/48 |

FOREIGN PATENT DOCUMENTS 2300265  7/1974  Fed. Rep. of Germany .
53-5262  2/1972  Japan .

Primary Examiner—S. Kastler, III
Attorney, Agent, or Firm—Fay, Sharpe, Beall, Fagan, Minnich & McKee

[57] ABSTRACT

An exothermic cutting torch includes a first cylindrical member receiving a second member therein. The second member includes radially extending portions formed by axially extending grooves. A first passage having plural passage portions is defined between the first and second members for conveying an oxidizing gas from a supply end to a combustion end of the cutting torch. Each of the radially extending portions defines a second passage portion also for conveying oxidizing gas to the combustion end. The second member engages an inner peripheral portion of the first member as a result of a stretch reducing operation to fuse the members together. A third passage may also be defined along the central axis of the torch if desired.

9 Claims, 2 Drawing Sheets

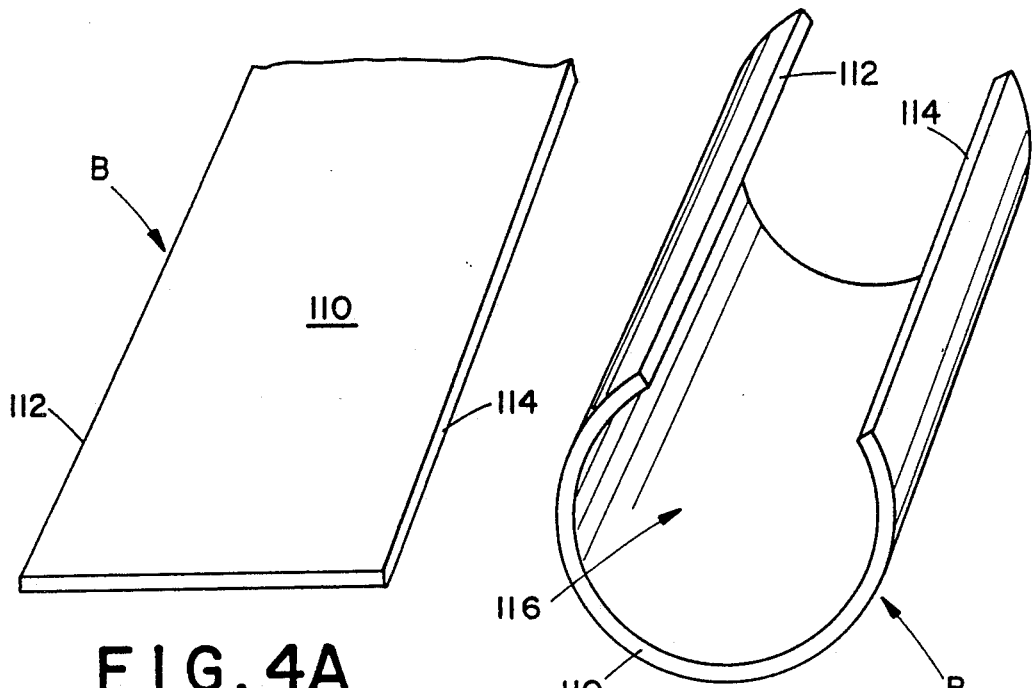
FIG. 4A
FIG. 4B
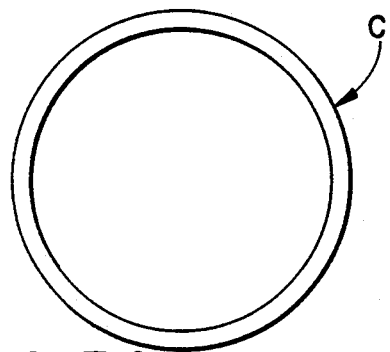
FIG. 5A
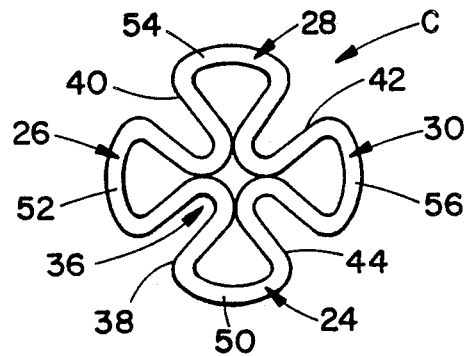
FIG. 5B
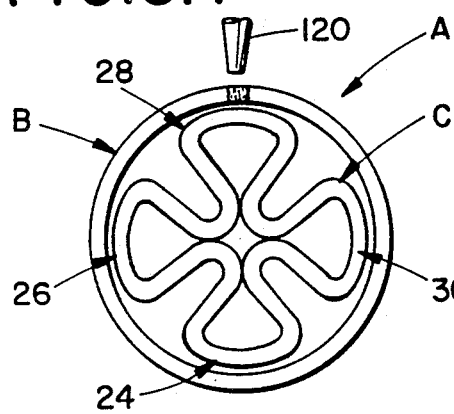
FIG. 6A
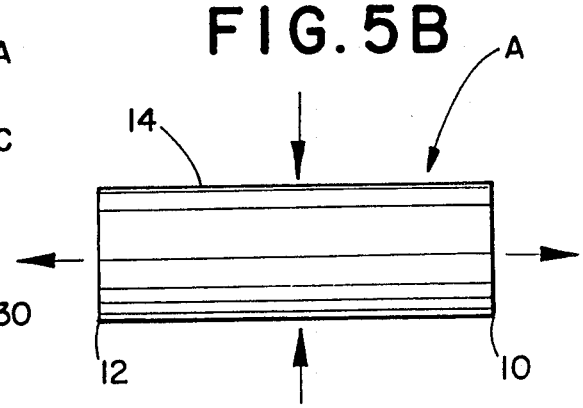
FIG. 6B

EXOTHERMIC CUTTING TORCH

BACKGROUND OF THE INVENTION

This invention pertains to the art of exothermic cutting torches or cutting bars and more particularly to consumable cutting torches or cutting rods.

The invention is more particularly applicable to an oxygen-fed cutting torch used for cutting, boring, burning, and the like of hard base materials. However, it will be appreciated that the invention has broader applications and may be advantageously employed in other environments and applications.

Conventional cutting torches or thermic lances are well known in the art as represented by U.S. Pat. Nos. 4,114,863; 4,416,444; and 3,921,542. Each of these patents generally teaches the use of a first or outer tube through which is fed an oxidizing gas such as oxygen. The oxidizing gas is ignited in any known manner. For example, an electric arc may be used to initiate the combustion process.

The outer tube may receive a second or inner tube, and/or a set of consumable metallic rods. Gas passages are defined between the rods and tubes to convey the oxidizing gas from a gas supply connected at one end to a combustion end of the cutting torch. The volatile nature of the combustion is used to pierce hard base materials such as cast iron, steel, concrete, or rock. As the combustion process continues, the torch is consumed and, therefore, must be periodically replaced.

The length of time between replacement of cutting torches is a primary factor in considering the efficiency of a particular design. Another major factor is the effectiveness of the cutting operation. Still another factor is the expense of manufacture of the cutting torches. All of these factors, and others, must be considered in evaluating efficiency, performance, and effectiveness of operation.

Other performance characteristics are an important consideration when developing an improved cutting torch. For example, the structure in U.S. Pat. No. 4,114,863 has been effective in reducing the "splatter" associated with such a cutting operation. The tube within a tube design, having plural rods disposed in the inner tube, has proved to be highly successful in concentrating the thermic reaction. It is believed that the inner and outer tubes define a gas envelope that confines the splatter associated with the cutting operation.

As discussed in that patent, the tubes are locked against relative axial movement through use of plural detents that extend radially inward from the outer tube toward the outer periphery of the inner tube. Although deemed highly effective in retaining the tubes together, the cross sectional profile of the cutting torch is slightly altered and may have a tendency to disrupt the focussed action of the tube within a tube design.

Retention of the rods in the inner tube is also difficult. Either a friction fit can be used to maintain the rods in place or, alternatively, a detent arrangement similar to that employed between the inner and outer tubes can be used. Again, the cross sectional profile of the cutting torch can thereby change and have some minute impact on the consistency and uniformity of the cutting torch's performance.

Some recent attempts have been made to alter the manufacture of the cutting torches by roll forming a structure from a single strip or sheet of material. Although this is believed to be an inexpensive manner to manufacture a cutting torch, a potential problem exists with this arrangement. Specifically, the roll formed sheet is folded or crimped along a longitudinal seam. Oftentimes, the seam is filled with a plastic material to provide a gas tight seal. Any bending or flexing of the cutting torch may potentially expose the seam, particularly the plastic material, to stresses and strains that may breach the seal and result in undesirable leakage of the oxidizing gas.

The present invention contemplates new and improved apparatus and method of forming same that overcome the above referred to problems and others in an economical, simple manner.

SUMMARY OF THE INVENTION

According to the present invention, the subject cutting torch has an increased cutting performance that is uniform and consistent throughout the cut.

The new cutting torch includes a first outer, generally cylindrical member receiving a second member therein. The second member includes radially extending portions that form a first passage with the outer member. The radially extending portions also form a second passage for conveying oxidizing gas to a combustion end of the cutting torch.

According to another aspect of the invention, the second member includes a central third passage for conveying oxidizing gas to the combustion end.

According to still another aspect of the invention, the radially extending portions include necked-down regions separating the second and third passages.

According to yet another aspect of the invention, inner peripheral portions of the first member are fused to discrete, circumferentially spaced portions of the second member.

According to the preferred method of forming the inventive cutting torch, the second member is a generally cylindrical and creased along spaced peripheral regions to define the radially extending portions.

According to a still further aspect of the forming method, the diameter of the first member is reduced to engage the second member along generally equally spaced, circumferential portions.

A principal advantage of the invention resides in the increased performance of the cutting torch.

Yet another advantage of the invention is found in uniform, consistent combustion.

Still another advantage of the invention results from the ease of manufacture of the cutting torch.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, preferred embodiments and methods of forming which will be described in detail in this specification and illustrated in the accompanying drawings which form a part hereof, and wherein:

FIG. 4A is a perspective view of the first member prior to forming;

FIG. 4B is a perspective view of the first member being formed into a generally cylindrical configuration;

FIG. 5A is a front elevational view of the second member;

FIG. 5B is a front elevational view of the second member after formation of longitudinal grooves through a creasing operation;

FIG. 6A is a front elevational view of the composite structure upon initial insertion of the second member into the first member; and FIG. 6B is a side elevational view of the composite structure generally illustrating reducing the diameter thereof.

DETAILED DESCRIPTION OF THE PREFERRED EMBODIMENTS AND METHOD OF FORMING SAME

Figure 1:
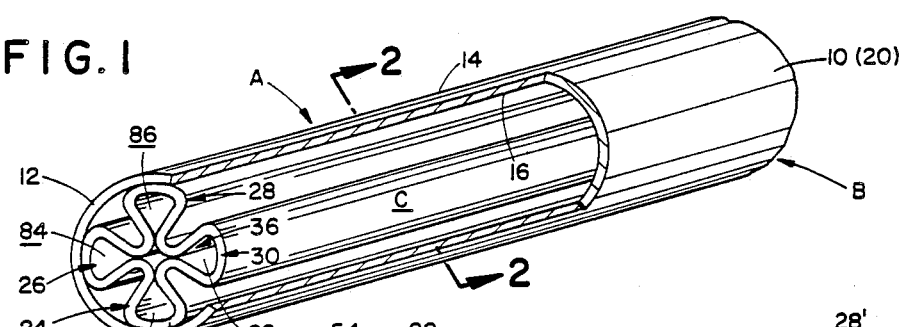
FIG. 1 is a perspective view partially cut away illustrating the subject invention.

Referring now to the drawings wherein the showings are for purposes of illustrating the preferred embodiments and method of forming the invention only and not for purposes of limiting same, the FIGURES show a cutting torch A having a first or outer generally tubular member B that receives a second member C therein.

Figure 2:
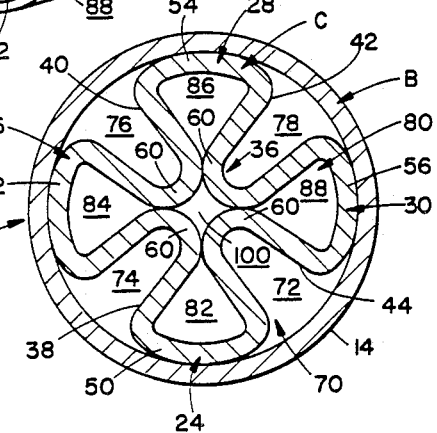
FIG. 2 is a cross sectional view taken generally along the lines 2—2 of FIG. 1.

More particularly, and with reference to FIGS. 1 and 2, the first tubular member A has a first or supply end 10 and a second or combustion end 12. As will be understood by those skilled in the art, the first end is operatively connected to a source of an oxidizing gas such as oxygen (not shown). The oxidizing gas travels via various passages to the second end of the assembly as will become more apparent below. A suitable means for igniting the second end (not shown) is provided and the oxidizing gas reacts with the metal of the cutting electrode to define a self-supporting flame that consumes the torch over a period of time. The flame is directed substantially axially outward from the cutting torch for boring, cutting, and the like. A wide range of materials may be utilized to sustain the thermic reaction at the second end of the assembly. Further, a wide range of cross-sectional shapes may be theoretically used but the circular cross-section of the first member is preferred.

Outer surface 14 of the first tubular member is generally smooth walled. For certain applications, such as underwater cutting, a layer of water impenetrable material may be provided thereon. A second or inner peripheral surface 16 is also preferably a smooth walled conformation.

The second or inner member C is substantially coextensive along the longitudinal axis of the torch assembly A with the first tubular member B. First end 20 of the second member also communicates with the supply of oxidizing gas, while second end 22 is defined at the combustion end of the torch assembly. As shown, the second member preferably includes four radially extending portions or lobes 24, 26, 28, 30 generally equally spaced circumferentially about the cross section of the cutting torch. The lobes merge at a central region 36 and extend radially outward into abutting engagement with the inner peripheral surface 16 of the outer tubular member in the finished product.

Specifically, each of the lobes is separated by a longitudinally extending groove 38, 40, 42, 44. In this manner, discrete outer peripheral portions 50, 52, 54, 56 engage the inner peripheral surface 16 of the outer tubular member. As illustrated in FIG. 2, these peripheral portions become integrally fused to the inner periphery of the first tubular member as will become more apparent below.

Each lobe defines a teardrop-shaped arrangement. Stated in another manner, each lobe includes a necked down region 60 adjacent the central region 36 that enlarges as the lobe extends radially outward. The lobes then decrease or neck down again just prior to merging into the inner peripheral portion of the outer member. Conversely, the grooves 38, 40, 42, 44 are generally V-shaped and narrow along a central portion where the lobes expand outwardly from their necked down regions.

In the embodiment of FIGS. 1 and 2, the inner, second member C defines a cross-sectional shape that is symmetrical along two mutually perpendicular axes passing through the longitudinal axis of the cutting torch. That is, lobes 24, 28 are substantial mirror images of one another across a horizontal axis, while lobes 26, 30 are substantially symmetrical about a vertical axis. Although preferred, the symmetrical relationship is not required as will become more apparent below.

The grooves defined in the outer peripheral surface of the second member cooperate with the inner periphery of the first member to define a first passage 70 for conveying oxidizing gas from the first end to the second end of the torch assembly. More specifically, the first passage is defined by four passage portions 72, 74, 76, 78. These passage portions are preferably continuous along the longitudinal extent of the cutting torch to define through openings that do not hinder passage of the oxidizing gas from the first end to the second end.

A second passage 80 is also comprised of four passage portions 82, 84, 86, 88. The second passage portions are entirely confined within a respective lobe and, like the associated lobe, are substantially teardrop-shaped in cross-section. The walls of the lobes separate each second passage portion from adjacent first passage portions so that the ratio of areas of the gas passages and metal is optimized in the cross-section of the cutting torch assembly.

The central region 36 may include a third passage 100 which in the preferred embodiment is again continuous along the axial extent of the cutting torch. More particularly the third passage is defined along the longitudinal axis of the torch assembly. The third passage 100 is also adapted to convey oxidizing gas from the first end to the second end of the torch. The necked down region 60 of each of the lobes separates the third passage from the first and second passages. The configuration of the second member, particularly the grooves and necked down regions of the lobes, defines a generally diamond-shaped third passage conformation.

Figure 3:
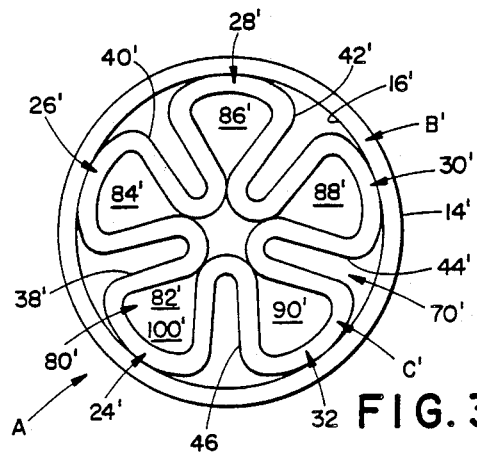
FIG. 3 is a cross sectional view of an alternate embodiment of the subject invention.

Of course, and as will be understood by one of ordinary skill in the art, the particular configurations may vary as a result of the number of lobes and grooves, as well as the radial extent of the grooves into the periphery of the second member. For example, and as illustrated in FIG. 3, the second member can undertake a different cross-sectional configuration. For ease of illustration and understanding, like elements are identified by like numerals with a primed suffix (') while new elements are identified by new numerals. In that arrangement, five lobes 24', 26', 28', 30', 32 extend generally radially outward from a central region 36'. The lobes are preferably equally spaced circumferentially so that the first and second passages 70', 80' are likewise equally spaced circumferentially around the cross-section of the alternate torch assembly A'. The grooves 50', 52', 54', 56', and a fifth groove 58 extend radially inward so that the necked down regions of the lobes engage to define a generally pentagonal-shaped third passage 100'.

As is apparent, the alternate assembly is only symmetrical about one axis, but the ratio of the areas defined by the gas passages and metal is controlled to maximize the thermic reaction of the cutting torch. As is apparent, a number of other suitable arrangements can be provided without departing from the scope and intent of the subject invention.

Turning now to FIGS. 4–6, the method of assembly of the preferred embodiments is illustrated and will be particularly referenced in the detailed description of the forming method to follow. A strip or sheet 110 having opposed side edges 112, 114 is provided from a roll or other suitable supply. The side edges 112, 114 are turned upwardly and toward one another as illustrated in FIG. 4B by a series of deforming rolls (not shown) or other conventional means. As the opposed edges are brought toward one another, a central, substantially closed cavity 116 is defined.

Formation of the second member is generally illustrated in FIGS. 5A and 5B. As shown therein, the second member B is defined by a generally cylindrical or tubular conformation having a circular cross-section in FIG. 5A. The circular cross-section can be formed by deforming a strip of material through a roll forming operation similar to that illustrated in FIGS. 4A and 4B with respect to the first member or any other well-known manner of forming a cylindrical member. The cylindrical second member is then deformed through a groove forming or creasing operation. Preferably the creasing operation is performed through use of a series of deforming rolls engaging the outer periphery of the cylindrical conformation. The deforming rolls urge circumferentially spaced selected portions radially inward to form the grooves 38, 40, 42, 44. Additionally, this creasing operation separates the second member into distinct lobes 24, 26, 28, 30.

The necked down regions pinch radial inner portions of each lobe together to form the second passage portions as illustrated in FIG. 5B. Through control of the amount of deformation, the central region may or may not include the central third passage 100 as desired.

Thereafter, the creased second member is inserted into the cavity 116 of the first member (FIG. 6A). The opposed side edges 112, 114 of the first member are secured together, preferably through a welding operation as illustrated by numeral 120. As particularly shown in FIG. 6A, the outer diameter of the creased second member is slightly smaller than the inner periphery of the formed first tubular member. Preferably the composite structure is stretch reduced, as represented by the arrows in FIG. 6B, to decrease the diameter of the outer tubular member into operative, fused engagement with the lobes along peripheral portions 50, 52, 54, 56. This stretch reducing operation completes the formation of the first passage portions and locks the inner member C to the outer member B. Thus, there is no need for dimples, detents, or other axial locking arrangements between the inner and outer members.

The composite structure may be stretch reduced in one of two manners to lock the first and second members together. A preferred arrangement is to stretch the composite structure on a draw bench that pulls the first and second members into a fused structure. It is also contemplated that during the roll forming operation that closes the first member around the second member, the composite structure can be pushed through a series of nibs to reduce the cross-sectional area and fuse the outer tubular member to the creased second member.

The diameter of the second member prior to the creasing operation is substantially the same as that of the first tubular member shown in FIG. 6A. Alternatively, the second member, prior to creasing may be slightly smaller or larger than the first tubular member depending on the amount of roll forming or creasing imparted thereto.

The welded outer jacket of the first tubular member limits potential problems with oxidizing gas leaking therethrough if the assembled cutting torch is inadvertently bent. Further, the stretch reducing operation in which the first and second members are fused together eliminates the need for any dimpling or detenting to lock the members together as indicated above. Thus, the present method of forming a cutting torch results in a uniform cross-section that provides a consistent, uniform burning. The orifices remain substantially constant throughout the longitudinal extent of the cutting torch and the primary thermic reaction or flame is directed substantially in an axial direction with a focussed action because of the uniform arrangement.

Preliminary studies have demonstrated the effective performance of the subject new cutting torch. When supplied with the same oxidizing gas at the same pressure and under similar conditions, the subject cutting torch exhibited increased burning times resulting in increased lengths of cuts. For example, a ¼" thick mild steel was cut by a commercially available "Caldo Torch" 36" in length and a 36" torch as shown in FIGS. 1–2 and constructed in accordance with the above description. An increased burning time of approximately 50% resulted with the subject invention over the burning time of the Caldo Torch. Further, an average cutting length of 35" was achieved with the torches shown in FIGS. 1–2 as compared to an average 35" cutting length with the Caldo Torches.

The invention has been described with reference to the preferred embodiments and method of forming same. Obviously, modifications and alterations will occur to others upon a reading and understanding of this specification. It is intended to include all such modifications and alterations in so far as they come within the scope of the appended claims or the equivalents thereof.

Having thus described the invention, it is now claimed:

1. An exothermic cutting torch comprising:
a generally cylindrical first member; and
a thin-walled second member received in said first member and being substantially axially coextensive therewith, said second member having at least two lobes wherein each lobe is defined by first and second radial portions that are spaced apart at an inner periphery of the first member and as the portions extend radially inward to a central region merge together into abutting engagement, said second member defining a first passage between said first and second members, and further defining a second passage encompassed by said radial portions.

2. The cutting torch as defined in claim 1 further comprising a third lobe defined by first and second radial portions that are spaced apart at the inner periphery of the first member and as the portions extend radially inward to the central region merge together into abutting engagement.

3. The cutting torch as defined in claim 1 wherein the radial portions of adjacent lobes are circumferentially spaced to define the second passages.

4. The cutting torch as defined in claim 1 further comprising a third passage disposed in the central region.

5. The cutting torch as defined in claim 1 wherein the first and second members are fused together along the inner periphery of the first member.

6. A cutting torch for cutting through materials comprising:
   a first generally cylindrical member adapted to receive an associated supply of oxygen at one end and react with the oxygen at the other end;
   a second member received in the first member and being substantially axially coextensive therewith, the second member having at least first and second lobes each defined by radial portions that are spaced at an outer radial area by circumferential portions which engage the inner periphery of the first member and merge toward one another into abutting engagement at a central region, the contiguous radial portions of adjacent lobes defining first passages with the first member for permitting the oxygen to flow from the first end to the second end, and the radial portions of each lobe defining enclosed second passages that also permit the oxygen to flow from the first end to the second end.

7. The cutting torch as defined in claim 6 further comprising third and fourth lobes each defined by radial portions that are spaced by circumferential portions along an outer radial region and merge toward one another into abutting engagement at a central region.

8. The cutting torch as defined in claim 7 wherein the lobes are substantially equispaced circumferentially.

9. The cutting torch as defined in claim 6 further comprising a third passage disposed radially inward of the merged radial portions for permitting the oxygen to flow from the first end to the second end.

* * * * *